(12) United States Patent
Lee

(10) Patent No.: US 7,477,428 B2
(45) Date of Patent: Jan. 13, 2009

(54) IMAGE FORMING APPARATUS HAVING SCANNING FUNCTION AND METHOD THEREOF

(75) Inventor: Chong-wan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 11/251,936

(22) Filed: Oct. 18, 2005

(65) Prior Publication Data

US 2006/0098249 A1    May 11, 2006

(30) Foreign Application Priority Data

Nov. 10, 2004    (KR) .................. 10-2004-0091391

(51) Int. Cl.
*H04N 1/04* (2006.01)
*H04N 1/387* (2006.01)
*H04N 1/32* (2006.01)
*G03G 15/00* (2006.01)

(52) U.S. Cl. .................. 358/474; 399/81; 399/72; 399/10; 399/15; 358/453; 358/468; 358/488

(58) Field of Classification Search ............ 399/10, 399/15, 72, 81
See application file for complete search history.

(56) References Cited

U.S. PATENT DOCUMENTS

| 5,548,414 A | * | 8/1996 | Sugano et al. .............. 358/452 |
| 2004/0004733 A1 | * | 1/2004 | Barker et al. ............... 358/1.13 |

FOREIGN PATENT DOCUMENTS

| JP | 63-240262 | 10/1988 |
| JP | 5-227411 | 9/1993 |
| KR | 96-43738 | 12/1996 |

* cited by examiner

*Primary Examiner*—Twyler L. Haskins
*Assistant Examiner*—Barbara D Reinier
(74) *Attorney, Agent, or Firm*—Stanzione & Kim, LLP

(57) ABSTRACT

An image forming apparatus having a scanning function and a method thereof are disclosed. The image forming apparatus includes a flatbed unit having a document region on which a document is placed and a menu region to designate a menu, a scanning unit to read document data and menu data by scanning the flatbed unit, and a control unit to control a specified operation corresponding to the menu data for the document data.

31 Claims, 3 Drawing Sheets

IMAGE FORMING APPARATUS HAVING SCANNING FUNCTION AND METHOD THEREOF

CROSS-REFERENCE TO RELATED APPLICATIONS

This application claims benefit under 35 U.S.C. § 119 from Korean Patent Application No. 2004-91391, filed on Nov. 10, 2004, in the Korean Intellectual Property Office, the disclosure of which is incorporated herein in its entirety by reference.

BACKGROUND OF THE INVENTION

1. Field of the Invention

The present general inventive concept relates to an image forming apparatus having a scanning function and a method thereof, and more particularly, to an image forming apparatus having a scanning function and a method thereof that can perform scanning of a document placed on a flatbed glass.

2. Description of the Related Art

A multifunctional appliance is a type of image forming apparatus having functions of a printer, a facsimile, a scanner, a copy machine, etc., as one appliance. A demand for such a multifunctional appliance is on an increasing trend. The multifunctional appliance has a plurality of function keys provided on an operation panel for performing diverse functions, such as functions of printing, faxing, scanning, copying, etc.

However, the operation panel of the multifunctional appliance is generally narrow in size, and the function keys provided on the narrow operation panel are set to provide a plurality of functions by a complicated manipulation of the function keys. Hence, in order to perform a desired function, a user must manipulate the function keys several times, and this causes difficulty and inconvenience to the user.

SUMMARY OF THE INVENTION

The present general inventive concept provides an image forming apparatus having a scanning function and a method thereof that can perform scanning of a document with a simple key manipulation and then print or fax the scanned document.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an image forming apparatus having a scanning function, including a flatbed unit having a document region on which a document is placed and a menu region to designate a menu, a scanning unit to read document data and menu data by scanning the flatbed unit, and a control unit to control a specified operation corresponding to the menu data for the document data.

The image forming apparatus may further include an operation panel unit having a key manipulation unit to be manipulated by a user and a display unit to display an operation state of the image forming apparatus.

The scanning may be performed when an operation start is requested through the operation panel unit, when the menu is designated through the menu region, and when the scanning unit is covered by a scanning cover.

The menu region can replace a function of the operation panel unit.

Print designation, scan designation, copy designation, fax designation, designation of a number of sheets, input of a fax number and option designation for the designated operation may be performed through the menu region.

The scanning unit can read the document data and the menu data corresponding to a checked operation by scanning the flatbed unit, and the control unit can perform the checked operation for the read document data based on the read menu data.

The image forming apparatus may further include a print engine unit to print the read document data if the checked operation is a copy operation, and the control unit can control the print engine unit to print the read document data if it is determined that the operation data read by the scanning unit corresponds to the copy operation.

The menu region may include a menu to specify a number of printed sheets through a user interface, and the control unit can control the print engine unit to print as many copies of the read document data as specified in the menu region.

The menu region may have a numeral input box to write numerals through the user interface, and the image forming apparatus may further include a transmission unit to transmit the read document data to a receiving-side facsimile by dialing a fax number of the receiving-side facsimile if the checked operation is a fax operation and the fax number of the receiving-side facsimile is written in the numeral input box.

The control unit can confirm the fax number of the receiving-side facsimile from the operation data read by the scanning unit, and can control the transmitting unit to transmit the document data to the receiving-side facsimile.

The flatbed unit may have a division region to divide the document region and the menu region from each other.

The image forming apparatus may further comprise a storage unit to store the read document data.

The flatbed unit may include a flatbed glass and the user interface may include an input pen.

The foregoing and/or other aspects of the present general inventive concept are also achieved by providing an image forming method in an image forming apparatus, the method including placing a document on a document region of a flatbed and designating an operation of the image forming apparatus in a menu region of the flatbed, receiving an input signal requesting scanning of the flatbed, reading document data corresponding to the document and menu data by scanning the flatbed, and performing the designated operation corresponding to the menu data for the document data.

The designating of the operation of the image forming apparatus may include checking a copy operation to request copying of the document from a plurality of operation menus displayed on the menu region of the flatbed. The reading of the document and menu data may include reading the document data and the menu data corresponding to a checked copy operation by scanning the flatbed. The performing of the designated operation may include printing the read document data based on the read menu data.

The designating of the operation of the image forming apparatus may include checking a fax operation to request a fax transmission of the document from the plurality of operation menus displayed on the menu region of the flatbed and writing a fax number of a receiving-side facsimile to which the document is to be transmitted in a numeral input box provided on the menu region of the flatbed. The performing the designated operation may include transmitting the read document data to the receiving-side facsimile by dialing the number of the receiving-side facsimile written in the numeral input box.

The reading of the document and menu data may include reading the document data, the menu data corresponding to the checked fax operation, and number data corresponding to the written fax number of the receiving-side facsimile. The transmitting of the read document data may include transmitting the read document data based on the read menu data and the read number data.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
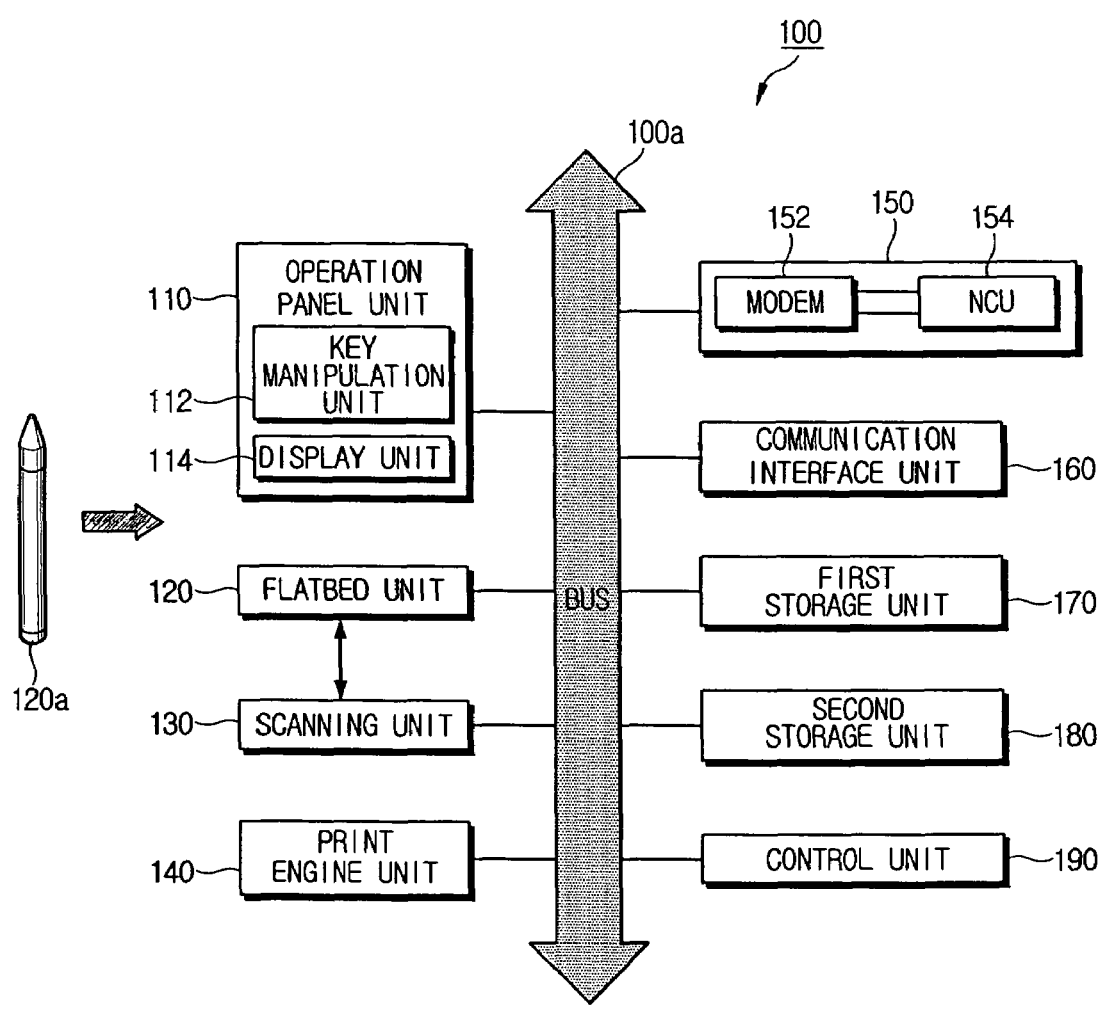
FIG. 1 is a block diagram illustrating a construction of an image forming apparatus having a scanning function according to an embodiment of the present general inventive concept.

In the following description, like drawing reference numerals are used for like elements even in different drawings. The matters defined in the description, such as a detailed construction and elements, are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 2:
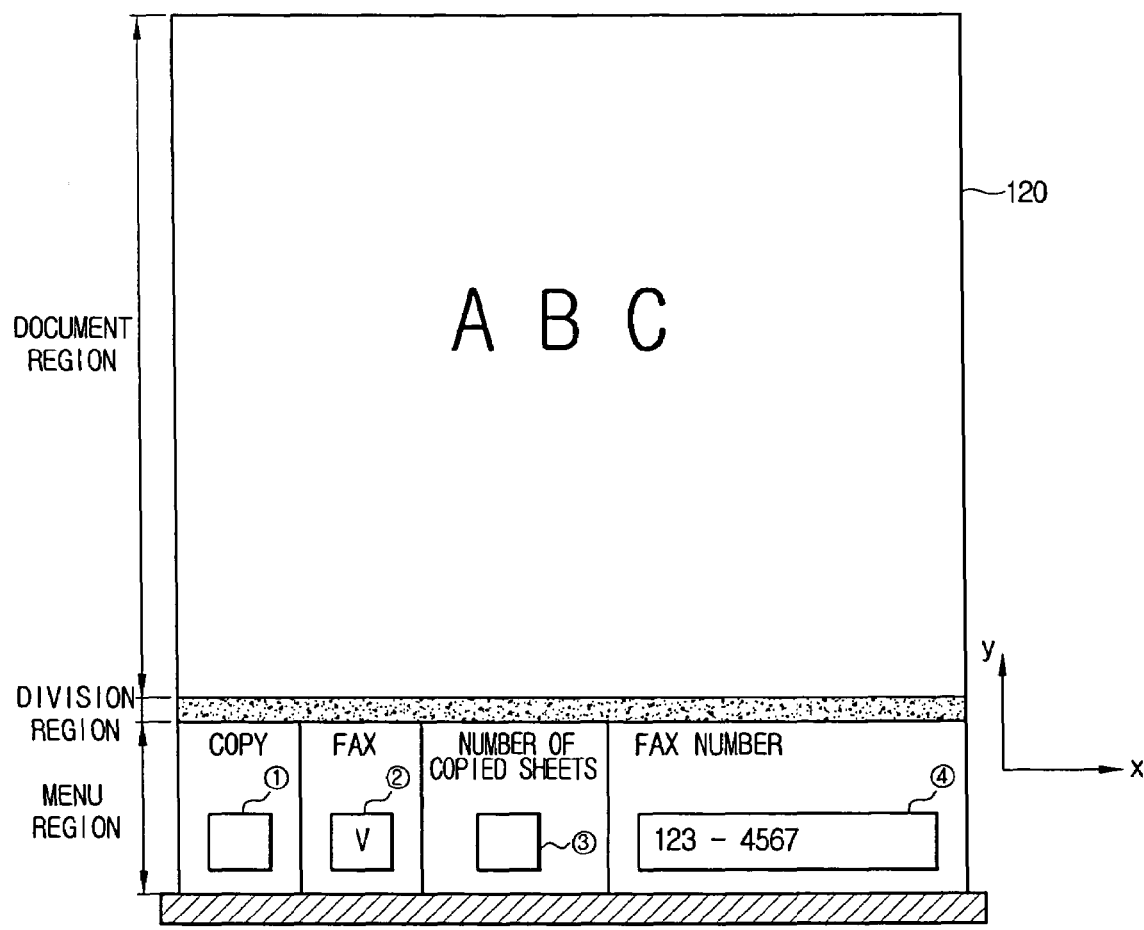
FIG. 2 is a view schematically illustrating a flatbed unit of the image forming apparatus of FIG. 1.

FIG. 1 is a block diagram illustrating a construction of an image forming apparatus 100 having a scanning function according to an embodiment of the present general inventive concept, and FIG. 2 is a view schematically illustrating a flatbed unit of the image forming apparatus of FIG. 1.

Referring to FIG. 1, the image forming apparatus 100 includes an operation panel unit 110, a flatbed unit 120, a scanning unit 130, a print engine unit 140, a fax transmission unit 150, a communication interface unit 160, a first storage unit 170, a second storage unit 180, and a control unit 190. A bus 100a provides data communication paths between the respective units of the image forming apparatus 100.

The operation panel unit 110 can be provided with a key manipulation unit 112 and a display unit 114. If a user selects a function supported by the image forming apparatus 100 through the key manipulation unit 112, the key manipulation unit 112 outputs a corresponding selection signal to the control unit 190. The key manipulation unit 112 can have various types of function keys to input characters or numerals and to select a function of the image forming apparatus 100. For example, the key manipulation unit 112 can output a selection signal to the control unit 190 corresponding to a copy mode to copy a document placed on the flatbed unit 120, a scan mode to scan the document, or a fax mode to fax the document.

The display unit 114 displays an operating state of the image forming apparatus 100 under the control of the control unit 190, and can be implemented by an LCD (Liquid Crystal Display).

The flatbed unit 120 is a document support board on which the document can be placed, and is made of glass. When scanning begins after the document to be scanned is placed on the flatbed unit 120, the scanning unit 130 reads image data by scanning the document.

In this embodiment of the present general inventive concept, the user may directly write a specified document on the flatbed unit 120 using a user interface unit 120a, such as a pen type user interface, and the scanning unit 130 can read the image data by scanning the document directly written on the flatbed unit 120. The written document may be removed with a medium, for example, an eraser type medium, such as a type used to erase a white board.

As illustrated in FIG. 2, the flatbed unit 120 is divided into a document region, a menu region, and a division region.

The document region is a region on which the document is placed.

The menu region can be used instead of the key manipulation unit 112 to select the function of the image forming apparatus 100, and can input operation information, such as a fax number of a receiving-side facsimile and a number of sheets to be copied. The menu region includes menus relating to respective functions of the image forming apparatus 100, such as a copy operation and a fax operation, and menus relating to settings of the functions, such as the number of sheets to be copied and the fax number of the receiving-side facsimile. For example, check boxes ① and ② can be used to select the copy operation and the fax operation, respectively, and numeral input boxes ③ and ④ can be used to write the number of sheets to be copied and the fax number of the receiving-side facsimile, respectively. The menu region is not limited to the example illustrated in FIG. 2, and menus relating to a print operation and menus corresponding to other optional functions of the image forming apparatus 100 may also be displayed on the menu region.

As illustrated in FIG. 2, when a user wants to fax a document, the user can check the check box ② corresponding to the fax operation by writing a mark 'V' in the check box using the user interface unit 120a. The user can input the fax number of the receiving-side facsimile in the corresponding numeral input box ④ of the menu region using the user interface unit 120a. The user can write a document on the document region using the user interface unit 120a, such as for example, 'ABC' as illustrated in FIG. 2, or the user can place a document on the document region. The user then manipulates the key manipulation unit 112 to request the scanning unit 130 to scan the document. When the scanning unit 130 scans the document, the control unit 190 determines that the check box ② corresponding to the fax operation is checked and controls the fax transmission unit 150 to fax the document to the number entered in the corresponding numeral input box ④ of the menu region.

When a user wants to copy a document, the user checks the check box ① corresponding to the copy operation using the user interface unit 120a. The user can write the document to be copied on the document region or place the document to be copied on the document region. The user can also specify a number of copies in the corresponding numeral input box ③. The scanning unit 130 then scans the document. When the scanning unit 130 scans the document, the control unit 190 determines that the check box ① corresponding to the copy operation is checked and controls the print engine unit 140 to print the number of copies of the document specified in the corresponding numeral input box ③.

The division region divides the document region and the menu region from each other, and may be implemented as a black bar or a position mark to indicate a position at which the document is to be placed. In the case in which the position mark is displayed on the division region, the document can be aligned on the flatbed unit 120 on the basis of the position mark of the division region.

The scanning unit 130 reads the image data by scanning the document placed the document region or the document directly written on the document region. The scanning unit 130 can be a flatbed type which reads the image data from the document placed or written on the flatbed unit 120 by moving an image sensor.

The scanning unit 130 can include a light source, such as a fluorescent tube or light emitting diode (LED), and an image sensor, such as a charge coupled device (CCD) or a charge injection device (CID), to read the image data. The image sensor converts a quantity of electric charge accumulated by light incident thereon for a specified time into an electric signal.

In the present embodiment, when scanning is requested through the key manipulation unit 112 of the operation panel unit 110 after a specified operation is checked from the menus (for example, the copy operation, the fax operation, etc.) displayed on the menu region of the flatbed unit 120, the scanning unit 130 reads the image data of the document and operation data corresponding to the specified operation checked on the menu region by scanning the flatbed unit 120. As described above, the scanning unit 130 can begin scanning the document when scanning is requested through the key manipulation unit 112 of the operation panel unit 110. The scanning unit 130 can also begin scanning the document automatically when any menu is designated on the menu region of the flatbed unit 120 or when the flatbed unit 120 is covered by a scanning cover (not shown).

The operation data can include coordinate values (e.g., x-axis and y-axis values) of a numeral written in one of the numeral input boxes ③ and ④ of the menu region using the user interface unit 120a or coordinate values of contents checked in the check boxes ① and ② of the menu region. The scanning unit 130 outputs the read image data to the second storage 180, and outputs the operation data to the control unit 190.

The read image data can be printed, transmitted to a receiving-side facsimile, or transmitted to an external computer according to the checked operation.

The print engine unit 140 prints the scanned document data according to printing conditions, such as the number of sheets to be copied. The printing conditions can be set by a user in the menu region using the user interface 120a.

The communication interface unit 160 can access an external network to support data communications. For example, the communication interface unit 160 can use a universal serial bus (USB) module to connect to the external network. The external network (not illustrated) may include a computer, a network connected to a computer, and other external devices which can provide print data to the image forming apparatus 100.

The fax transmission unit 150 transmits fax data (i.e. the read image data) to the receiving-side facsimile (not illustrated) or receives fax data from the receiving-side facsimile. The fax transmission unit 150 can include a modem 152 and a network control unit (NCU) 154.

The modem 152 modulates the fax data to be transmitted to the receiving-side facsimile, and demodulates the fax data received from the receiving-side facsimile. The NCU 154 connects the modem 152 to a public switched telephone network (PSTN), forms a call path by dialing the fax number of the receiving-side facsimile, and then transmits the fax data to the receiving-side facsimile.

The first storage unit 170 is a nonvolatile memory device, and stores control programs to perform the operations of the image forming apparatus 100, such as firmware to perform the operations of an office machine, etc.

The first storage unit 170 also stores an algorithm to determine coordinate values and dimensions of regions on which the respective menus are displayed in the menu region of the flatbed unit 120 and to determine numerals written in the numeral input boxes of the menu region. For example, the first storage unit 170 can store the coordinate values and dimensions of a region occupied by the 'copy operation' check box ①, a region occupied by the 'fax operation' check box ②, a region occupied by the 'number of copied sheets' numeral input box ③, and a region occupied by the 'fax number' numeral input box ④. The stored coordinate values and dimensions are used by the control unit 190 to determine the operation checked in the menu region through the user interface unit 120a and the settings specified in the menu region, such as the number of sheets to be copied and the fax number of the receiving-side facsimile.

For example, if the coordinate values of the operation data read by the scanning unit 130 are included in the region of the 'fax operation' check box ②, the control unit 190 determines that the operation selected through the user interface unit 120a is the fax operation. Additionally, the control unit 190 confirms the fax number of the receiving-side facsimile included in the read operation data using a specified algorithm to retrieve the operation data included in the region of the 'fax number' numeral input box ④, and controls the fax transmission unit 150 to dial the confirmed fax number.

As described above, the first storage unit 170 stores coordinate values and dimensions of the check boxes and numeral input boxes ① through ④ corresponding to the respective menus, so that the control unit 190 can judge the operation checked through the user interface unit 120a.

The second storage unit 180 stores various types of data generated during operations of the image forming apparatus 100. For example, the second storage unit 180 stores the image data read by the scanning unit 130.

The control unit 190 controls the operations of the image forming apparatus 100 according to the control programs stored in the first storage unit 180. In the present embodiment, scanning is requested through the key manipulation unit 112 after an operation of the image forming apparatus 100 is selected in the menu region of the flatbed unit 120 using the user interface unit 120a and the document is placed or written on the document region. When the scanning is requested in the key manipulation unit 112, the control unit 190 controls the scanning unit 130 to scan the flatbed unit 120.

The control unit 190 then determines the operation selected using the user interface unit 120a based on the operation data read by the scanning unit 130, and controls the image forming apparatus to perform the selected operation with respect to the document data read by the scanning unit 130. That is, the control unit 190 confirms the coordinate values of the read operation data, and then determines the operation corresponding to the region that includes the confirmed coordinate values within the menu region.

For example, if the coordinate values of the region in which the 'copy operation' check box ① is displayed are stored in the first storage unit 170 as values of '0~10' and '0~20' in x and y directions, respectively, and the coordinate values of the read operation data are located within the ranges '0~10' and '0~20' in x and y directions, respectively, the control unit 190 determines that the selected operation is the copy operation. Additionally, if a number written in the 'number of copied sheets' numeral input box ③ is confirmed from the coordinate values of the read operation data, the control unit 190 controls the print engine unit 140 to print as many copies of the document as the written number.

If the scanning unit 130 scans the flatbed unit 120 after the check box ① corresponding to the 'copy operation' is checked using the user interface unit 120*a*, a numeral '3' is written in the numeral input box ③ corresponding to the 'number of copied sheets,' and a document such as 'ABC' is written on the document region, the control unit 190 controls the print engine unit 140 to copy three sheets of the document 'ABC'.

If the scanning unit 130 scans the flatbed unit 120 after the check box ② corresponding to the 'fax operation' is checked using the user interface unit 120*a*, a fax number of '123-4567' is written in the numeral input box ④ corresponding to the fax number of the receiving-side facsimile, and a document such as 'ABC' is written on the document region, the control unit 190 determines that the selected operation is the 'fax operation' based on the read operation data and determines that the fax number of the receiving-side facsimile is '123-4567'. Accordingly, the control unit 190 controls the fax transmission unit 150 to fax the contents 'ABC' to the receiving-side facsimile corresponding to the fax number of '123-4567'.

Figure 3:
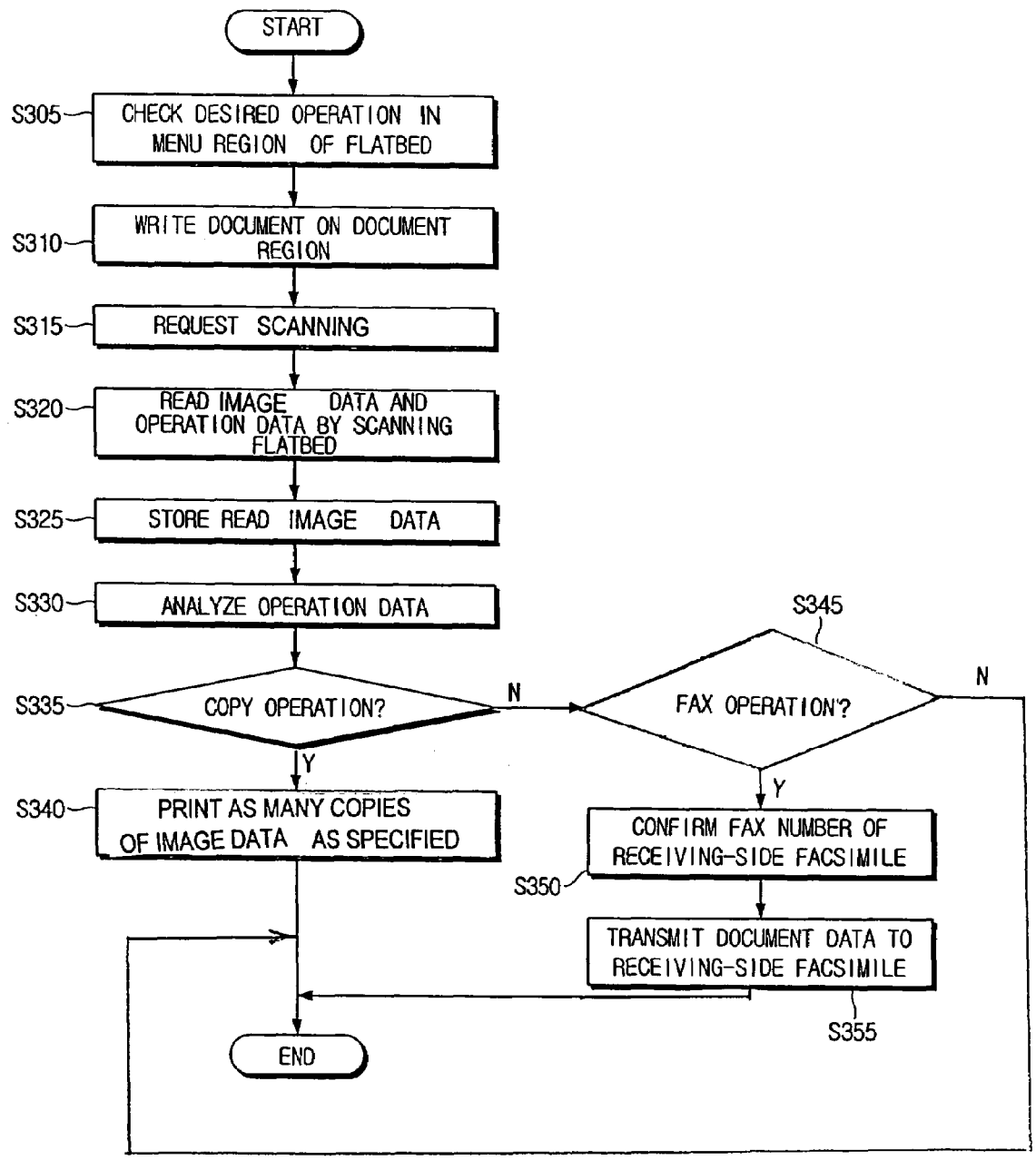
FIG. 3 is a flowchart illustrating an image forming method using a scanning function of the image forming apparatus of FIG. 1 according to an embodiment of the present general inventive concept.

FIG. 3 is a flowchart illustrating an image forming method of the image forming apparatus of FIG. 1 according to an embodiment of the present general inventive concept.

Referring to FIGS. 1 through 3, a desired operation is checked in the menu region of the flatbed unit 120 (operation S305), and a document is placed or written on the document region of the flatbed unit 120 (operation S310). Next, scanning is requested through the key manipulation unit 112 (operation S315). The control unit 190 then controls the scanning unit 130 to read the image data corresponding to the document and the operation data corresponding to the checked operation by scanning the flatbed unit 120 (operation S320).

The control unit 190 stores the read image data in the second storage unit 180 (operation S325). Then, the control unit 190 analyzes the read operation data to determine the operation checked at operation S305 (operation S330).

The control unit 190 determines whether the copy operation is selected based on the analyzed operation data (operation S335). If the control unit 190 determines that the copy operation is selected, the control unit 190 controls the print engine unit 140 to print as many copies of the image data as the numeral specified in the numeral input box ③ corresponding to the 'number of copied sheets' (operation S340).

If the control unit 190 determines that the copy operation is not selected the control unit 190 determines whether the fax operation is selected based on the analyzed operation data (operation S345). If the control unit 190 determines that the fax operation is selected, the control unit 190 confirms the fax number of the receiving-side facsimile written in the corresponding numeral input box ④ (operation S350).

Then, the control unit 190 controls the fax transmission unit 150 to fax the image data stored at operation S325 to the receiving-side facsimile by dialing the confirmed fax number (operation S355). If the control unit 190 determines that neither the copy operation nor the fax operation is selected, the image forming apparatus 100 does not print copies of the image data or fax the image data.

When a document has a specified color, the image forming apparatus 100 according to an embodiment of the present general inventive concept can scan the color document using an RGB level.

That is, if a menu related to color operation is selected by the user in a state that menus, such as a color copy operation, color fax operation, etc., are provided in the menu region of the flatbed unit 120, the image forming apparatus 100 can perform the selected color operation. For example, if the user selects the color copy operation on the menu region and writes the document using a blue user interface unit 120*a*, the image forming apparatus 100 can scan and copy the document to print the blue document.

As described above, according to the embodiments of the present general inventive concept, a desired operation can be requested using menus provided on a flatbed glass, and thus the convenience in use of the image forming apparatus can be improved. Additionally, a low-cost design can be realized by minimizing the function of the operation panel unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a scanning function, comprising:
    a flatbed unit having a document region on which a document is placed and a menu region to specify an operation and settings of the image forming apparatus;
    a scanning unit to read document data of the document and menu data of the designated menu by scanning the flatbed unit; and
    a control unit to control the specified operation corresponding to the menu data for the document data.

2. The image forming apparatus as claimed in claim 1, further comprising:
    an operation panel unit having a key manipulation unit to be manipulated by a user and a display unit to display an operation state of the image forming apparatus.

3. The image forming apparatus as claimed in claim 2, wherein the scanning unit reads the document data and the menu data when scanning is requested through the operation panel unit, when the operation is designated through the menu region, and when the scanning unit is covered by a scanning cover.

4. The image forming apparatus as claimed in claim 2, wherein the menu region is manipulatable by a user to specify the operation.

5. The image forming apparatus as claimed in claim 1, wherein the operation and settings specified by the menu region comprise a print operation, a scan operation, a copy operation, a fax operation, a number of copies, and a fax number.

6. The image forming apparatus as claimed in claim 1, wherein the scanning unit reads the document data and the menu data corresponding to the specified operation by scanning the flatbed unit, and the control unit performs the specified operation for the read document data based on the read menu data.

7. The image forming apparatus as claimed in claim 6, further comprising:
    a print engine unit to print the read document data if the specified operation is a copy operation, wherein the control unit controls the print engine unit to print the read document data if the control unit determines that the menu data read by the scanning unit corresponds to the copy operation.

8. The image forming apparatus as claimed in claim 1, wherein the menu region comprises a menu to specify a number of copies through a user interface, and the control unit controls the print engine unit to print as many copies of the read document data as specified by the menu region.

9. The image forming apparatus as claimed in claim 1, further comprising:
a transmission unit to transmit the read document data to a receiving-side facsimile by dialing a fax number of the receiving-side facsimile if the specified operation is a fax operation, wherein the menu region comprises a numeral input box to input a fax number of the receiving side facsimile through a user interface, and the control unit confirms the fax number of the receiving-side facsimile from the menu data read by the scanning unit, and controls the transmitting unit to transmit the document data to the receiving-side facsimile.

10. The image forming apparatus as claimed in claim 1, wherein the flatbed unit comprises a division region to divide the document region and the menu region from each other.

11. The image forming apparatus as claimed in claim 1, further comprising:
a storage unit to store the read document data.

12. The image forming apparatus as claimed in claim 1, further comprising a user interface unit to enter information to the menu region to specify the operation and the settings.

13. The image forming apparatus as claimed in claim 12, wherein the flatbed unit comprises a flatbed glass, and the user interface comprises an input pen.

14. An image forming apparatus, comprising:
a flatbed scanning unit comprising one or more first fields to specify one or more operations, respectively, and a document region;
a sensor to read operation data from the one or more first fields and document data from the document region;
a user interface unit to select at least one of the operations by selecting the respective first field; and
a control unit to determine the selected at least one operation based on the read operation data and to control the image forming apparatus to perform the selected operation using the read document data.

15. The image forming apparatus as claimed in claim 14, wherein the flatbed scanning unit further comprises one or more second fields to specify settings of the operations, the user interface enters information into the one or more second fields to set the settings and the control unit controls the image forming apparatus to perform the selected operation to the read document data according to the set settings.

16. The image forming apparatus as claimed in claim 14, wherein the one more first fields are disposed at predetermined coordinates on the flatbed scanning unit and the control unit determines the selected at least one operation by comparing a location of the user interface selection with the predetermined coordinates.

17. The image forming apparatus as claimed in claim 14, further comprising:
a printing unit; and
a fax unit, wherein when the control unit determines that the selected at least one operation includes a copying operation, the control unit controls the printing unit to print one or more copies of the read document information, and when the control unit determines that the selected at least one operation includes a fax operation, the control unit controls the fax unit to fax the read document data.

18. The image forming apparatus as claimed in claim 14, wherein the user interface unit inputs contents to the document region of the flatbed scanning unit, and the flatbed scanning unit reads the input contents as the document information.

19. An image forming method in an image forming apparatus, comprising:
placing a document on a document region of a flatbed and designating an operation of the image forming apparatus in a menu region of the flatbed;
receiving an input signal requesting scanning of the flatbed;
reading document data corresponding to the document from the document region and menu data from the menu region by scanning the flatbed; and
performing the designated operation corresponding to the menu data for the document data.

20. The image forming method as claimed in claim 19, wherein:
the designating of the operation of the image forming apparatus comprises checking a copy operation to request copying of the document from a plurality of operation menus displayed on the menu region of the flatbed;
the reading of the document data and the menu data comprises reading the document data and the menu data corresponding to the checked copy operation; and
the performing of the designated operation comprises printing one or more copies of the read document data according to the read menu data.

21. The image forming method as claimed in claim 19, wherein:
the designating of the operation of the image forming apparatus comprises checking a fax operation to request a fax transmission of the document from a plurality of operation menus displayed on the menu region of the flatbed, and writing a fax number of a receiving-side facsimile to which the document is to be transmitted on a numeral input box provided on the menu region of the flatbed;
the reading of the document data and the menu data comprises reading the document data and the menu data corresponding to the checked fax operation and the written fax number; and
the performing of the designated operation comprises transmitting the read document data to the receiving-side facsimile by dialing the written fax number of the receiving-side facsimile according to the read menu data.

22. The image forming method as claimed in claim 19, wherein a division region to divide the document region and the menu region of the flatbed from each other is further displayed on the flatbed.

23. The image forming method as claimed in claim 19, wherein the designating of the operation of the image forming apparatus comprises inputting information to the menu region of the flatbed using a user interface.

24. The image forming method as claimed in claim 23, wherein the flatbed is made of glass and the user interface includes an input pen.

25. A method of controlling an image forming apparatus, the method comprising:
scanning a flatbed of the image forming apparatus to read document data from a document region of the flatbed and operation data from a menu region of the flatbed;
analyzing the read operation data to determine a selected operation of the image forming apparatus; and
controlling the image forming apparatus to perform the selected operation using the read document data.

26. The method as claimed in claim 25, wherein the analyzing of the read operation data comprises:

comparing a location of the operation data in the menu region with predetermined locations in the menu region corresponding to operations of the image forming apparatus; and determining the one of the operations as the selected operation when the location of the operation data corresponds to the predetermined location of the operation.

27. The method as claimed in claim 25, wherein the analyzing of the read operation data comprises analyzing the read operation data to determine settings of the selected operation specified in the menu region, and the controlling of the image forming apparatus comprises controlling the image forming apparatus to perform the selected operation to the read document data according to the determined settings.

28. The method as claimed in claim 25, wherein the controlling of the image forming apparatus comprises:

printing one or more copies of the read document data when it is determined that the selected operation is a copy operation; and faxing the read document data when it is determined that the selected operation is a fax operation.

29. A computer readable recording medium containing an image forming method in an image forming apparatus, the method comprising:

placing a document on a document region of a flatbed and designating an operation of the image forming apparatus in a menu region of the flatbed;

receiving a user input signal requesting scanning of the flatbed;

reading document data corresponding to the document from the document region and menu data from the menu region by scanning the flatbed; and performing the designated operation corresponding to the menu data for the document data.

30. A computer readable recording medium containing a method of controlling an image forming apparatus, the method comprising:

scanning a flatbed of the image forming apparatus to read document data from a document region of the flatbed and operation data from a menu region of the flatbed;

analyzing the read menu data to determine a selected operation of the image forming apparatus; and controlling the image forming apparatus to perform the selected operation using the read document data.

31. An image forming method in an image forming apparatus, comprising:

reading document data corresponding to a document from the document region of a flatbed and menu data from a menu region of the flatbed by scanning the flatbed; and performing a designated operation corresponding to the menu data for the document data.

* * * * *